United States Patent
Swanson et al.

(10) Patent No.: US 12,316,499 B2
(45) Date of Patent: May 27, 2025

(54) METHOD, SYSTEM AND COMPUTER PROGRAM PRODUCT FOR BACKUP ASSIGNMENT OF A MOBILE ELECTRONICS DEVICE

(71) Applicant: MOTOROLA SOLUTIONS, INC., Chicago, IL (US)

(72) Inventors: Alexander H Swanson, Perth (GB); Robin Iddon, Edinburgh (GB); Hamish Martin, Edinburgh (GB); Stuart J Boutell, Edinburgh (GB)

(73) Assignee: MOTOROLA SOLUTIONS INC., Chicago, IL (US)

( * ) Notice: Subject to any disclaimer, the term of this patent is extended or adjusted under 35 U.S.C. 154(b) by 0 days.

(21) Appl. No.: 18/548,374

(22) PCT Filed: Jul. 21, 2022

(86) PCT No.: PCT/US2022/037787
§ 371 (c)(1),
(2) Date: Aug. 30, 2023

(87) PCT Pub. No.: WO2023/018531
PCT Pub. Date: Feb. 16, 2023

(65) Prior Publication Data
US 2024/0305528 A1    Sep. 12, 2024

Related U.S. Application Data

(63) Continuation of application No. 17/444,781, filed on Aug. 10, 2021, now abandoned.

(51) Int. Cl.
*H04L 41/0853*    (2022.01)
*G06F 11/14*    (2006.01)
(Continued)

(52) U.S. Cl.
CPC ........ *H04L 41/0856* (2013.01); *H04L 67/289* (2013.01); *H04L 67/2869* (2022.05)

(58) Field of Classification Search
CPC .............. H04L 41/0856; H04L 67/289; H04L 67/2869; G06F 11/1456; G06F 11/1466; G06F 11/1489; G06F 11/1464
See application file for complete search history.

(56) References Cited

U.S. PATENT DOCUMENTS 8,909,779 B2 * 12/2014 Clair ................... H04L 41/0806
386/358
9,509,719 B2    11/2016 Neely
(Continued)

FOREIGN PATENT DOCUMENTS

KR    20170076121 A    7/2017
WO    2002099596 A2    12/2002

OTHER PUBLICATIONS

The International Search Report and the Written Opionion, corresponding patent application No. PCT/US2022/037787 filed: Jul. 21, 2022, mailed Oct. 25, 2022, all pages.

*Primary Examiner* — Alina A Boutah

(57) ABSTRACT

A method, system and computer program product for backup assignment of a mobile electronics device is disclosed. In response to one or more device assignment requests received by a controller apparatus when a server is operating in an off-line mode, one or more device assignment records are created within the controller apparatus, and which indicate assignment of the at least one mobile electronics device to a respective one or more users. When the server is operating in an off-line mode such that communication between the controller apparatus and the server is off-line, the one or more device assignment records, in relation to the at least one mobile electronics device, are stored in the controller apparatus. In response to the server (Continued)

re-entering the on-line mode, the server is updated with the one or more device assignment records.

16 Claims, 3 Drawing Sheets

(51) Int. Cl.
*H04L 67/2869* (2022.01)
*H04L 67/289* (2022.01)

(56) References Cited

U.S. PATENT DOCUMENTS

| | | | | |
|---|---|---|---|---|
| 10,796,393 | B2* | 10/2020 | Messerges | G06Q 50/265 |
| 11,237,918 | B2* | 2/2022 | Hickman | G06F 16/9538 |
| 2002/0137544 | A1* | 9/2002 | Myojo | H04L 67/04 |
| | | | | 455/557 |
| 2012/0166642 | A1* | 6/2012 | Saint Clair | H04L 12/2838 |
| | | | | 709/225 |
| 2012/0257526 | A1* | 10/2012 | Moeller | H04L 47/24 |
| | | | | 370/252 |
| 2014/0281490 | A1* | 9/2014 | Prakash | H04W 12/35 |
| | | | | 455/411 |
| 2017/0255991 | A1 | 9/2017 | Ramamurthy et al. | |
| 2017/0266036 | A1 | 9/2017 | Taylor | |
| 2019/0108097 | A1 | 4/2019 | Zhuang et al. | |
| 2019/0287199 | A1 | 9/2019 | Messerges et al. | |
| 2021/0212168 | A1* | 7/2021 | Yoden | H04W 88/06 |

* cited by examiner

METHOD, SYSTEM AND COMPUTER PROGRAM PRODUCT FOR BACKUP ASSIGNMENT OF A MOBILE ELECTRONICS DEVICE

CROSS-REFERENCE TO RELATED APPLICATIONS

This is the U.S. National Stage of International Application No. PCT/US2022/037787 filed Jul. 21, 2022, which is a continuation of U.S. patent application Ser. No. 17/444,781 filed Aug. 10, 2021, the entire contents of these applications are incorporated herein by reference in their entireties.

BACKGROUND

Different reasons may exist for poor network and connectivity issues. For example, sometimes part of the network communications path is copper-based wiring, and thus this path is vulnerable to being broken when lines are cut or damaged during, for instance, a construction project within the area of the lines. Another example reason for connectivity issues is data server failure. Also, router issues can sometimes be the source of the problem too, and equipment failure may potentially affect a complete network failure. Without backup or redundant system(s), operations relying on connectivity can come to a screeching halt.

In addition to situations involving poor network and connectivity issues, backup or redundant system(s) are also important, for effectively similar reasons, when a relied upon server (normally communicating with one or more devices over a network) needs to be taken down for routine maintenance, or for some other reason (e.g. upgrading functionality within the server).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
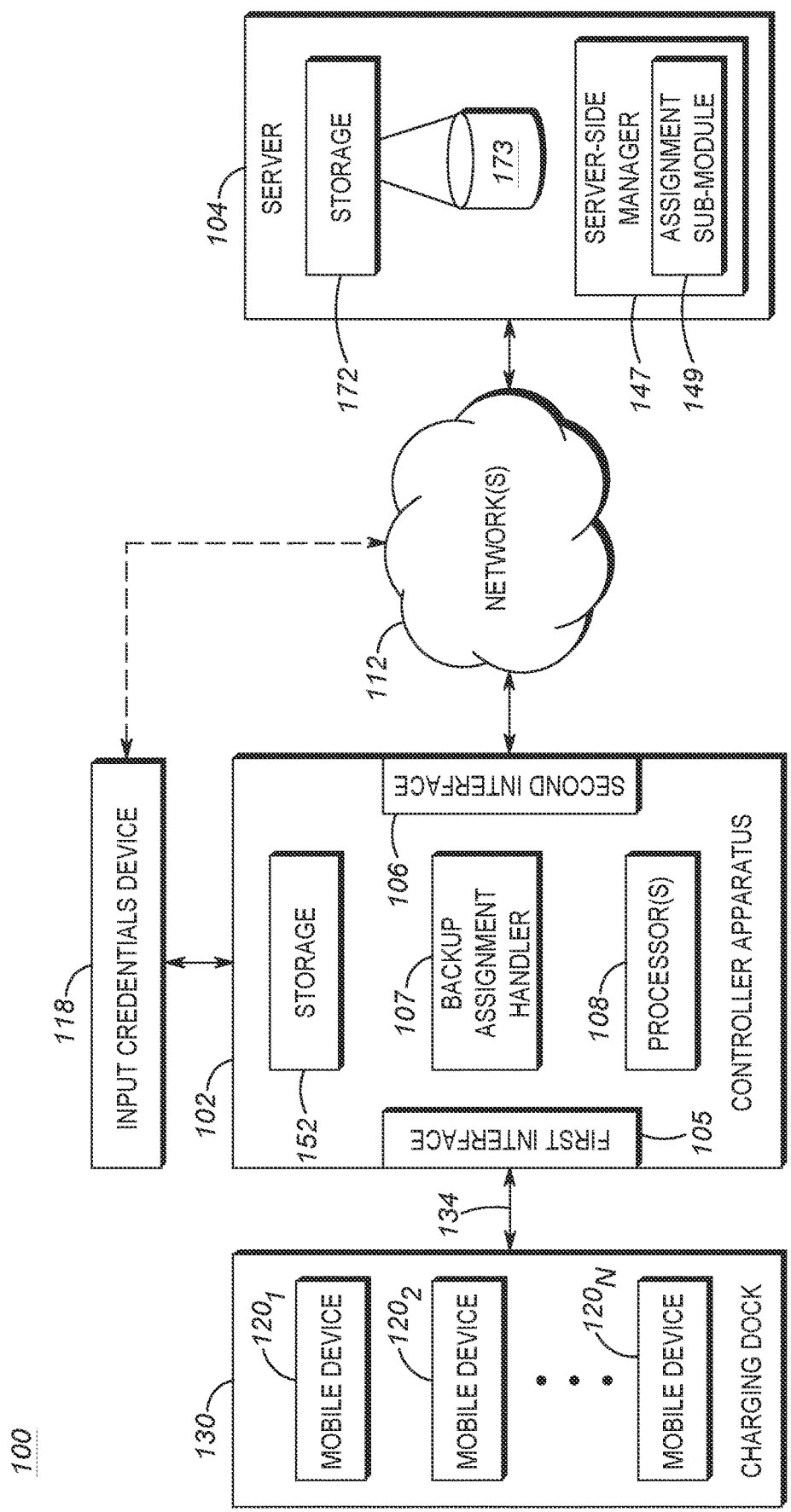
FIG. 1 is a block diagram of a system within which methods in accordance with example embodiments can be carried out.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a controller apparatus that includes a first interface communicatively couplable to at least one mobile electronics device. The controller apparatus also includes a second interface communicatively couplable over at least one network to a server. The server, when operating in a normal mode associated with communications between the controller apparatus and the server being on-line, records each of the at least one mobile electronics device as being assigned to a respective user. The controller apparatus also includes at least one processor, and at least one non-transient computer readable medium communicatively connected to the at least one processor. The at least one non-transient computer readable medium is configured to store one or more device assignment records in relation to the at least one mobile electronics device, indicating assignment of the at least one mobile electronics device to a respective one or more users, when the server operates in an off-line mode when communication between the controller apparatus and the server is off-line. The at least one non-transient computer readable medium is also configured to store computer program instructions. The computer program instructions, when executed by the at least one processor, cause the controller apparatus to: in response to one or more device assignment requests received when the server is operating in the off-line mode, create the one or more device assignment records, and in response to the server re-entering the normal mode, update the server with the one or more device assignment records.

In accordance with another example embodiment, there is provided a method that includes providing a controller apparatus, at least one mobile electronics device communicatively coupled to the controller apparatus, and a server communicatively coupled over at least one network to the controller apparatus. The server, when operating in a normal mode associated with communications between the controller apparatus and the server being on-line, records each of the at least one mobile electronics device as being assigned to a respective user. The method also includes creating within the controller apparatus (and in response to one or more device assignment requests received by the controller apparatus when the server is operating in an off-line mode), one or more device assignment records indicating assignment of the at least one mobile electronics device to a respective one or more users. The method also includes, storing in the controller apparatus (and when the server is operating in the off-line mode such that communication between the controller apparatus and the server is off-line), the one or more device assignment records in relation to the at least one mobile electronics device. The method also includes updating, in response to the server re-entering the normal mode, the server with the one or more device assignment records.

Each of the above-mentioned embodiments will be discussed in more detail below, starting with example system and device architectures of the system in which the embodiments may be practiced, followed by an illustration of processing blocks for achieving an improved technical method, device, and system for backup assignment of a mobile electronics device.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a Software as a Service (SaaS), Platform as a Service (PaaS), or Infrastructure as a Service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Reference is now made to the drawings. In the drawings, FIG. 1 is a block diagram of a system 100 within which methods in accordance with example embodiments can be carried out.

Continuing on, illustrated controller apparatus 102 forms a part of the system 100, and includes a first interface 105, a second interface 106, a backup assignment handler 107, one or more processors 108, and a storage 152 (in one non-limiting example, all of these components may be contained within a single device housing).

The controller apparatus 102 communicates with a server 104 over one or more networks 112 via the second interface 106. The one or more networks 112 can include the Internet, or one or more other public/private networks coupled together by network switches or other communication elements. The one or more networks 112 could be of the form of, for example, client-server networks, peer-to-peer networks, etc. Data connections between the controller apparatus 102 and the server 104 can be any number of known arrangements for accessing a data communications network, such as, for example, Ethernet connections (i.e. any suitable data connections compliant with one or more of the IEEE 802.3 family of standards), dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, Radio Frequency (RF) links).

Still with reference to FIG. 1, the illustrated system 100 also includes a credentials input device 118. The illustrated credentials input device 118 is coupled to the controller apparatus 102, and it may also be optionally coupled via a communications path to the server 104 (e.g. coupled via the one or more networks 112). More details regarding the credentials input device 118 are described later herein.

Continuing on, the system 100 also includes a plurality of mobile electronics devices $120_1$-$120_N$ (hereinafter interchangeably referred to as "mobile electronics devices $120_1$-$120_N$" when referring to all of the illustrated devices, or "mobile electronics device 120" when referring to any individual one of the plurality). In the illustrated example embodiment, the mobile electronics devices $120_1$-$120_N$ are docked in a charging dock 130 of the system 100 (however other implementations are contemplated including, for example, an implementation version where each of the mobile electronics devices $120_1$-$120_N$ are connected via a separate wired connection to the controller apparatus 102, without an intervening dock). Also, it will be understood that, in some examples, the mobile electronics device 120 is assigned to a respective new device user on a periodic basis. For example, on Monday morning the mobile electronics device 120 might be assigned to John Smith, and then the next day (Tuesday morning) a different user (e.g. Jane Doe) might be assigned that same device.

Regarding the charging dock 130, this is connected to the first interface 105 of the controller apparatus 102 by at least one wired connection 134. The at least one wired connection 134 may be any suitable form of direct or indirect wired connection that supports the bidirectional communications between the mobile electronics devices $120_1$-$120_N$ (via the charging dock 130) and the controller apparatus 102, and examples of wired connections include Universal Serial Bus (USB), Ethernet (i.e. IEEE 802.3 family of standards), Serial AT Attachment (SATA), Parallel AT Attachment (PATA), High Definition Multimedia Interface (HDMI), etcetera.

Also, although FIG. 1 illustratively implies a one-to-one relationship between the charging dock 130 and the controller apparatus 102, this is not necessarily so. In some examples, the controller apparatus 102 may support two charging docks (i.e. a one-to-two relationship), six charging docks (i.e. a one-to-six relationship), or any other suitable number of charging docks (i.e. any suitable one-to-many relationship) is also contemplated.

In at least one example where the mobile electronics devices $120_1$-$120_N$ are body-worn cameras, the charging dock 130 may include a plurality of sockets/ports sized to receive the mobile electronics devices $120_1$-$120_N$ for attachment to the charging dock 130 via suitable mating electrical connectors such as can be found in the Videobadge VB-400™ 14-port dock sold by Motorola Solutions, Inc. Various alternatives are of course also contemplated. For example, instead of a single charging dock with a plurality sockets/ports an alternative setup may instead have a plurality single-port charging docks (for instance, several of the VB400™ 1-port docks sold by Motorola Solutions, Inc.) connected to the controller apparatus 102.

Referring now to the server 104, this includes a server-side manager 147 in respect of which an assignment sub-module 149 (associated with control of device assignments during normal server operation) forms a part thereof. (More details regarding the assignment sub-module 149 are provided later herein). The server 104 also includes storage 172. In some examples, the server-side manager can be a video manager, and can manage video, video metadata and other data stored in the storage 172.

Figure 2:
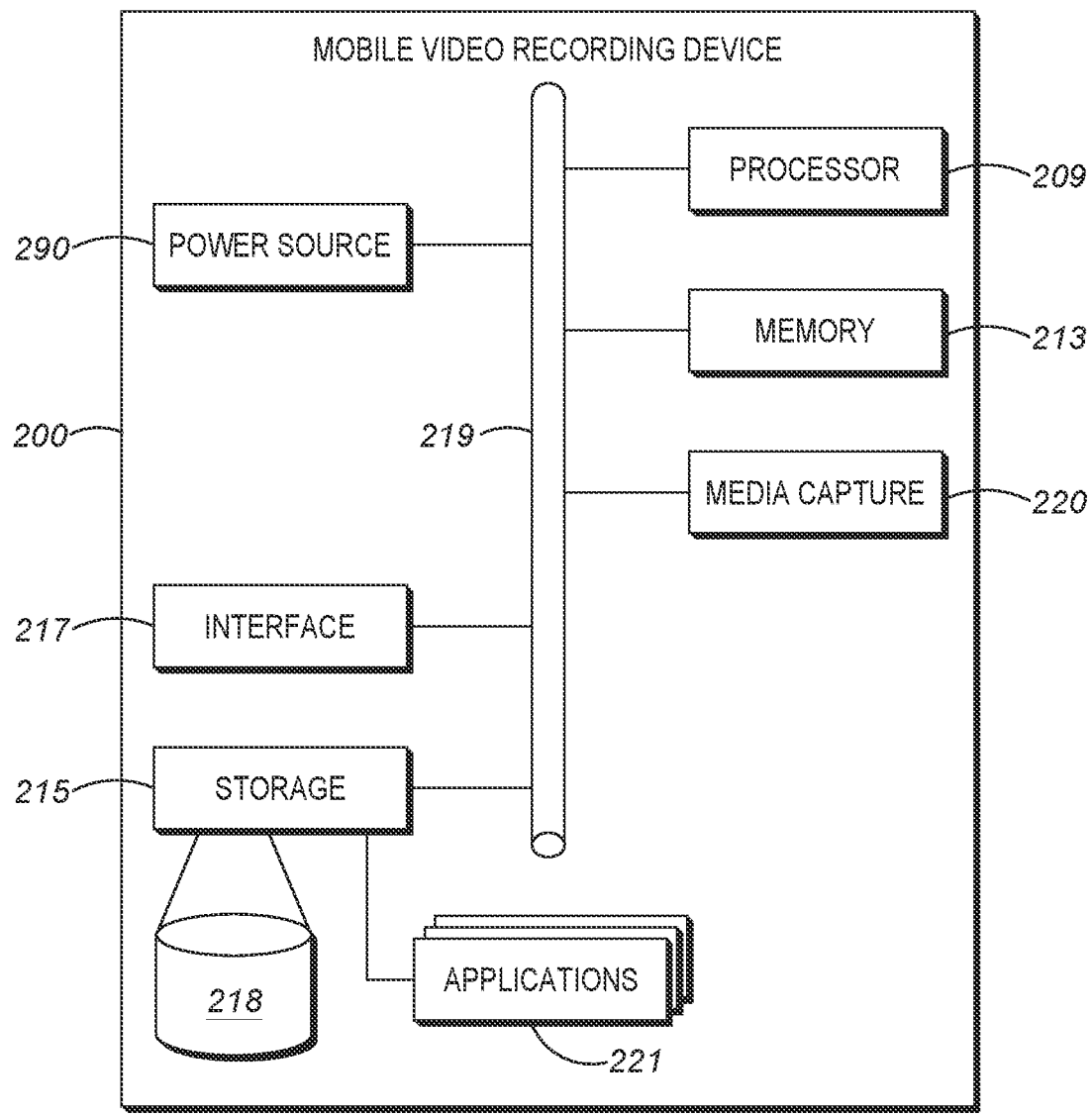
FIG. 2 is a block diagram showing, in accordance with one example embodiment, more details of one of the mobile electronics devices shown in FIG. 1.

In some example embodiments, the mobile electronics device 120 is a mobile video recording device, such as mobile video recording device 200 shown and illustrated in FIG. 2. The mobile video recording device 200 records video (and in some examples also records audio in addition to video).

As will be understood by those skilled in the art, the components of the mobile video recording device 200 may comprise any suitable physical form, configuration, number, type and/or layout. As an example, and not by way of limitation, the mobile video recording device 200 may comprise an embedded computer system, a System-On-Chip (SOC), a Single-Board Computer system (SBC) (such as, for example, a Computer-On-Module (COM) or system-on-module (SOM)), a wearable or body-borne computer with video recording capability (and either with or without audio recording capability), an intelligent body-worn camera (and either with or without audio recording capability), etcetera.

In the depicted embodiment, the mobile video recording device 200 includes a processor 209, memory 213, storage 215, interface 217, bus 219, and power source 290. Regarding the processor 209, this may be a microprocessor, controller, or any other suitable computing device, resource, or combination of hardware, software and/or encoded logic operable to provide, either alone or in conjunction with other components, (for example, the memory 213) device processing functionality. Such functionality may include any one or more of wireless networking functionality, image/video processing functionality, analytics functionality, audio processing functionality, etcetera. In particular examples, the processor 209 may include hardware for executing instructions, such as those making up a computer program. As one example (and not by way of limitation) to execute instructions, the processor 209 may retrieve (or fetch) instructions from an internal register, an internal cache, the memory 213, or the storage 215; decode and execute them; and then write one or more results to an internal register, an internal cache, the memory 213, or the storage 215.

In particular examples, the processor 209 may include one or more internal caches for data, instructions, or addresses. This disclosure contemplates the processor 209 including any suitable number of any suitable internal caches (for example, instruction cache(s), data cache(s), etcetera), where appropriate. Instructions in the instruction caches may be copies of instructions in the memory 213 or the storage 215 and the instruction caches may speed up retrieval of those instructions by the processor 209. Data in the data caches may be copies of data in the memory 213 or the storage 215 for instructions executing at the processor 209 to operate on; the results of previous instructions executed at the processor 209 for access by subsequent instructions executing at the processor 209, or for writing to the memory 213, or the storage 215; or other suitable data. The data caches may speed up read or write operations by the processor 209. In particular examples, the processor 209 may include one or more internal registers for data, instructions, or addresses. Depending on the example, the processor 209 may include any suitable number of any suitable internal registers, where appropriate.

Still with reference to FIG. 2, the memory 213 may be any form of volatile or non-volatile memory including, without limitation, Random Access Memory (RAM), Read-Only Memory (ROM), flash memory, removable media, etcetera. In particular examples, the memory 213 may include Random Access Memory (RAM). This RAM may be Dynamic RAM (DRAM), Static RAM (SRAM), or some other suitable type of RAM. The memory 213 may include one or more memories 213, where appropriate. The memory 213 may store any suitable data or information utilized by the recording device, including software embedded in a computer readable medium, and/or encoded logic incorporated in hardware or otherwise stored (e.g., firmware). In particular examples, one or more Memory Management Units (MMUs) may reside between the processor 209 and the memory 213 and facilitate accesses to the memory 213 requested by the processor 209.

As an example and not by way of limitation, the mobile video recording device 200 may load instructions from the storage 215 or another source (such as, for example, another computer system) to the memory 213. The processor 209 may then load the instructions from the memory 213 to an internal register or internal cache. To execute the instructions, the processor 209 may retrieve the instructions from the internal register or internal cache and decode them. During or after execution of the instructions, the processor 209 may write one or more results (which may be intermediate or final results) to the internal register or internal cache. The processor 209 may then write one or more of those results to the memory 213. In particular examples, the processor 209 may execute only instructions in one or more internal registers or internal caches or in the memory 213 (as opposed to the storage 215 or elsewhere) and may operate only on data in one or more internal registers or internal caches or in the memory 213 (as opposed to the storage 215 or elsewhere).

In particular examples, the storage 215 may include mass storage for data or instructions. As an example and not by way of limitation, the storage 215 may include a Hard Disk Drive (HDD), flash memory, an optical disc, or a USB drive or a combination of two or more of these. The storage 215 may include removable or non-removable (or fixed) media, where appropriate. The storage 215 may be internal or external to the mobile video recording device 200, where appropriate. In particular examples, the storage 215 may be non-volatile, solid-state memory. In particular examples, the storage 215 may include Read-Only Memory (ROM). Where appropriate, this ROM may be mask-programmed ROM, Programmable ROM (PROM), Erasable PROM (EPROM), Electrically Erasable PROM (EEPROM), Electrically Alterable ROM (EAROM), or flash memory or a combination of two or more of these. The storage 215 may take any suitable physical form and may comprise any suitable number or type of storage. The storage 215 may include one or more storage control units facilitating communication between the processor 209 and the storage 215, where appropriate.

In particular examples, the interface 217 may include hardware, software, or both providing one or more interfaces for communication (such as, for example, packet-based communication) among the mobile video recording device 200, other recording devices similar to the mobile video recording device 200, any suitable networks, any suitable network devices, and/or any other suitable computer systems. As an example and not by way of limitation, the interface 217 may include a Network Interface Controller (NIC) or network adapter for communicating with an Ethernet or other wire-based network and/or a Wireless NIC (WNIC) or wireless adapter for communicating with a wireless network. In at least one example consistent with the example embodiment of FIG. 1, the interface 217 may also include a USB port to support USB-complaint communications.

In some embodiments, the interface 217 comprises one or more radios coupled to one or more physical antenna ports. Depending on the example implementation, the interface 217 may be any type of interface suitable for any type of suitable network with which the mobile video recording device 200 is used. As an example and not by way of limitation, the mobile video recording device 200 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the mobile video recording device 200 may be capable of communicating with a Wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The mobile video recording device 200 may include any suitable interface 217 for any one or more of these networks, where appropriate.

In some examples, the interface 217 may include one or more interfaces for one or more I/O devices. One or more of these I/O devices may enable communication between a person and the mobile video recording device 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular examples may include any suitable type and/or number of I/O devices and any suitable type and/or number of interfaces 217 for them. Where appropriate, the interface 217 may include one or more drivers enabling the processor 209 to drive one or more of these I/O devices. The interface 217 may include one or more interfaces 217, where appropriate.

The bus 219 may include any combination of hardware, software embedded in a computer readable medium, and/or encoded logic incorporated in hardware or otherwise stored (such as, for example, firmware) to couple components of the mobile video recording device 200 to each other. As an example and not by way of limitation, the bus 219 may include an Accelerated Graphics Port (AGP) or other graphics bus, an Enhanced Industry Standard Architecture (EISA) bus, a Front-Side Bus (FSB), a HYPERTRANSPORT (HT) interconnect, an Industry Standard Architecture (ISA) bus, an INFINIBAND interconnect, a Low-Pin-Count (LPC) bus, a memory bus, a Micro Channel Architecture (MCA) bus, a Peripheral Component Interconnect (PCI) bus, a PCI-Express (PCI-X) bus, a SATA bus, a Video Electronics Standards Association local (VLB) bus, or any other suitable bus or a combination of two or more of these. The bus 219 may include any number, type, and/or configuration of buses 219, where appropriate. In particular examples, one or more buses 219 (which may each include an address bus and a data bus) may couple the processor 209 to the memory 213. The bus 219 may include one or more memory buses.

Herein, reference to storage encompasses one or more tangible computer-readable storage media possessing structures. As an example and not by way of limitation, a computer-readable storage medium may include a semiconductor-based or other Integrated Circuit (IC) (such, as for example, a Field-Programmable Gate Array (FPGA) or an Application-Specific IC (ASIC)), a hard disk, an HDD, a Hybrid Hard Drive (HHD), an optical disc, an Optical Disc Drive (ODD), a magneto-optical disc, a magneto-optical drive, a floppy disk, a Floppy Disk Drive (FDD), magnetic tape, a holographic storage medium, a Solid-State Drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular examples may include one or more computer-readable storage media implementing any suitable storage. In particular examples, a computer-readable storage medium implements one or more portions of the processor 209 (such as, for example, one or more internal registers or caches), one or more portions of the memory 213, or a combination of these, where appropriate. In particular examples, a computer-readable storage medium implements RAM or ROM. In particular examples, a computer-readable storage medium implements volatile or persistent memory. In particular examples, one or more computer-readable storage media embody software.

Herein, reference to software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular examples, software includes one or more Application Programming Interfaces (APIs) stored or encoded in a computer-readable storage medium. Particular examples may use any suitable software written or otherwise expressed in any suitable programming language or combination of programming languages stored or encoded in any suitable type or number of computer-readable storage media. In particular examples, software may be expressed as source code or object code. In particular examples, software is expressed in a higher-level programming language, such as, for example, C, Python, Perl, Structured Query Language (SQL), or a suitable extension thereof. In particular examples, software is expressed in a lower-level programming language, such as assembly language (or machine code). In particular examples, software is expressed in scripting or command language that can be interpreted by a command-line interpreter (e.g., BASH in a UNIX environment). In particular examples, software is expressed in JAVA. In particular examples, software is expressed in Hyper Text Markup Language (HTML), Extensible Markup Language (XML), or other suitable markup language.

Regarding the power source 290 shown in FIG. 2, this provides operating power within the mobile video recording device 200. In some examples, the power source 290 includes one or more batteries.

Additionally, the mobile video recording device 200 can include a media capture component 220 as illustrated in FIG. 2. The media capture component 220 can include video-capture hardware and/or software (e.g., a camera including at least one lens and at least one image sensor), audio-capture hardware and/or software (e.g., a microphone), combinations of same, and/or the like. In a typical embodiment, the media capture component 220 enables the mobile video recording device 200 to capture video with audio or video without audio for processing and storage.

Operation of the mobile video recording device 200 can be facilitated by applications (software) 221. In certain embodiments, one or more of the applications 221 can access data store 218 on the storage 215. The data store 218 can include, for example, one or more databases, one or more flat files, and/or the like. In at least one example, the data store 218 can store configuration settings that govern when recording (for example, event recording) is to occur. For instance, the configuration settings of the data store 218 can be expressed as parameters. Furthermore, the applications 221 can operate to store audio and/or video captured such as, for example, using the media capture component 220, as individually identifiable recordings in the data store 218. In addition, or alternatively, in some examples, metadata related to each recording can be stored in the data store 218 in relation to the recording as a metadata record or file.

Continuing on, reference is made once again to FIG. 1 and the credentials input device 118. It will be understood that any of a variety of different implementations for the credentials input device 118 are contemplated, and examples include at least one of a Radio Frequency Identification (RFID) card reader, a Bluetooth-based reader, a keypad, a keyboard and a biometric reader (such as, for instance, a fingerprint reader, a retina reader, a face detection and recognition-supporting reader, etcetera). The details of installation, setup and operations of these various forms of readers are known to those skilled in the art.

In at least one alternative example, carrying out a device assignment of the mobile electronics device 120 within the system 100 takes the form of a kiosk experience (i.e. rather than one where a card is presented to a reader). In such an example, the kiosk may be, for instance, a personal computer running a rudimentary user interface which allows device users to go to a screen and enter some credential (for instance, a staff number). Under normal operation associated with the server 104 being on-line, the kiosk (i.e. the credentials input device 118) may send the credential(s) across the one or more networks 112 to the server 104 which would check the credential, then followed by a responsive communication back to the controller apparatus 102 facilitating assignment of the mobile electronics device 120.

Figure 3:
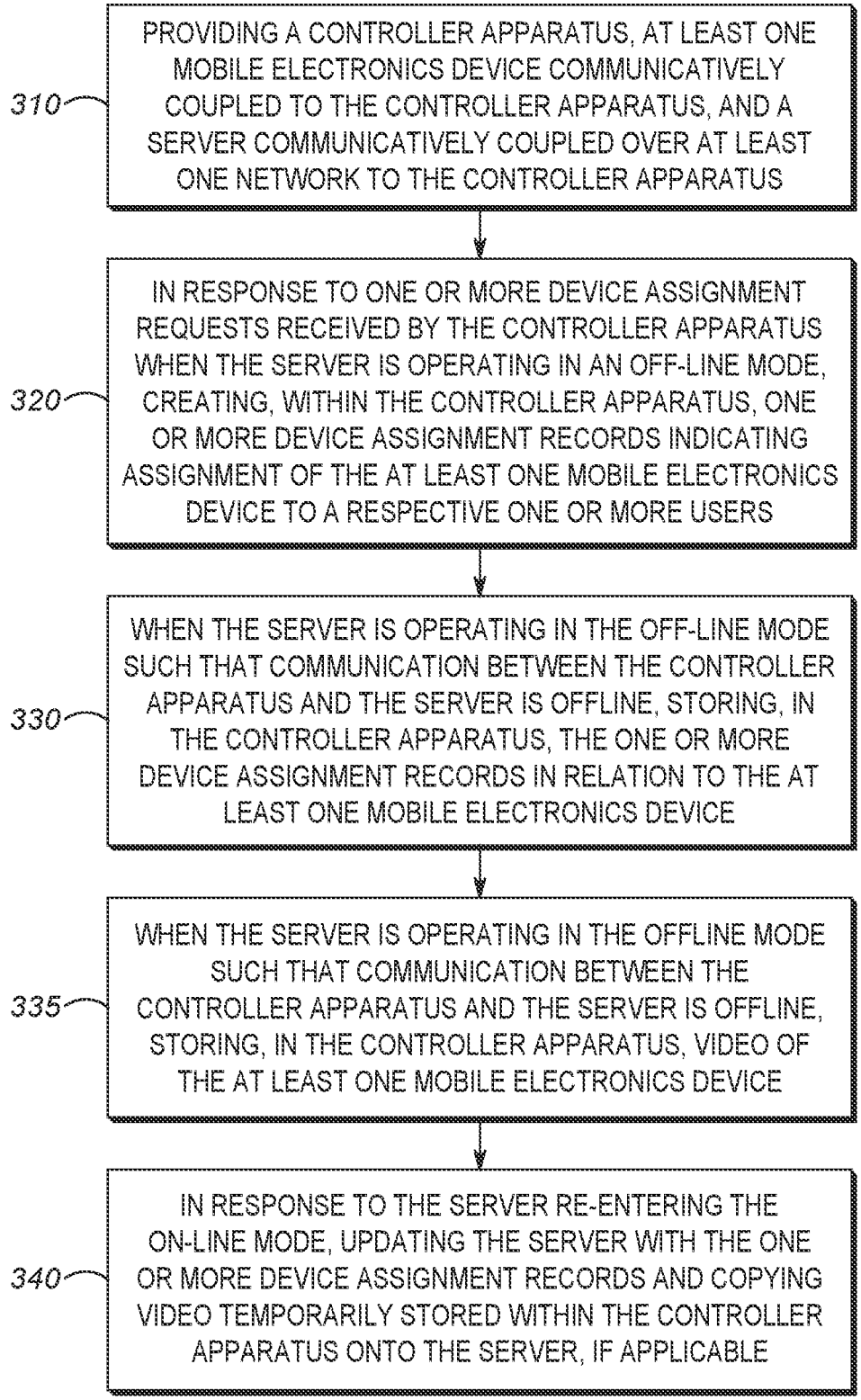
FIG. 3 is a flow chart illustrating a method in accordance with an example embodiment.

Reference is now made to FIG. 3. FIG. 3 is a flow chart illustrating a method 300 in accordance with an example embodiment.

First, the illustrated method 300 includes providing (310) a controller apparatus, at least one mobile electronics device communicatively coupled to the controller apparatus, and a server communicatively coupled over at least one network to the controller apparatus. The at least one mobile electronics device may be, for instance, the mobile video recording device 200 previously herein described (and it may also/alternatively be some other type of the mobile electronic device 120). The controller apparatus may be, for example, the controller apparatus 102 previously herein described. The server may be, for example, the server 104 previously herein described, and this server, when operating in a normal mode associated with communications between the controller apparatus and the server being on-line, is configured to record each of the at least one mobile electronics device as being assigned to a respective user.

Next, the illustrated method 300 includes creating (320), within the controller apparatus, one or more device assignment records indicating assignment of the at least one mobile electronics device to a respective one or more users. It is contemplated that this creating may be carried out by software (for example, code of the backup assignment handler 107 being executed on the one or more processors 108). With respect to any created device assignment record, this may be concurrently stored (when in off-line mode) in both: i) the mobile electronics device 120; and ii) the controller apparatus 102.

Also, the illustrated action 320 is in response to one or more device assignment requests received by the controller apparatus when the server is operating in an off-line mode. In some examples, the illustrated action 320 does not occur until a timer expires, where the timer starts counting once communications between the controller apparatus 102 and the server 104 is broken. The time period for the timer may be set to any suitable amount of time (for example, between one minute and ten minutes).

Next, the illustrated method 300 includes storing (330), in the controller apparatus (for example, in storage 152 shown in FIG. 1), the one or more device assignment records in relation to the at least one mobile electronics device. (In some examples, each creation of a device assignment record is also associated with creation of at least one respective and contemporaneous audit event which may be stored as well.) Also, the illustrated action 330 occurs when the server is operating in the off-line mode such that communication between the controller apparatus and the server is off-line. Also, the controller apparatus 102 may have capacity to temporarily store many device assignments (and associated data like audit events) during the off-line mode, and may keep all such data in a non-volatile part of the storage 152 so that the data is not lost should the controller apparatus 102 experience a loss of power or a reboot.

Next, the illustrated method 300 includes an optional action, which is storing (335) video of the at least one mobile electronics device 120 in the storage 152 during the off-line period. This is an optional part of the method 300 because the storage 152 need not necessarily be configured to do so (i.e. in one or more examples the action 335 is not carried out). Also, it will be understood that copying of such video to the storage 152 is for the purpose of temporary storage.

Eventually the server will re-enter the on-line mode (i.e. after a period where the server has been off-line). In response thereto, the server is updated (340) with the one or more device assignment records (which, in respect of at least one non-limiting example, includes synchronization-driven communications between the backup assignment handler 107 and the server-side manager 147). In regards to the illustrated action 340 of the method 300, the action 340 may occur effectively immediately after the time at which the on-line mode is re-entered; however the timing of the illustrated action 340 need not necessarily be in that manner, and it is also contemplated that there may be some time period between when the re-entering of the on-line mode occurs and when the illustrated action 340 occurs. It will be also understood that a timer and time period similar to the one previously herein described in relation to establishing that the server 104 has gone off-line may be employed here as well, except here expiration of the timer's period establishes that the server is back on-line.

Also, it will be understood that different scenarios for synchronization flowing from re-entry of the server 104 into on-line mode are contemplated. In the case where the mobile electronics device 120 was assigned out during the off-line mode, but not yet returned to the charging dock 130, synchronization may initially only between the controller apparatus 102 and the server 104. By contrast, in such case where the mobile electronics device 120 was assigned out during the off-line mode and has since been returned to the charging dock 130, synchronization may be between both: i) the controller apparatus 102 and the server 104; and ii) the mobile electronic device 120 and the server 104 (i.e. a plurality of synchronizations may occur in parallel or contemporaneously).

Drawing upon the example embodiment of FIG. 1, the server 104 re-entering the on-line mode may include the one or more device assignment records stored in the storage 152 of the controller apparatus 102 being transmitted over the one or more networks 112 to the server 104, so that these one or more device assignment records may be then stored in data store 173 of the storage 172 of the server 104. Similarly in the case where video has been temporarily stored in the storage 152, this too may be copied from the storage 152 to the storage 172 (of course if the controller apparatus 102 is not configured to store video at all, then there would be no such transfer of video from the controller apparatus 102 to the server 104).

Once all device assignment-related synchronizations are complete, it will be understood that control of device assignment is returned to the server (in at least one example this corresponds to a return transfer of delegated control going from the backup assignment handler 107 to the assignment sub-module 149 that forms a part of the server-side manager 147).

As should be apparent from this detailed description above, the operations and functions of electronic computing apparatuses are sufficiently complex as to require their implementation on a computer system, and cannot be performed, as a practical matter, in the human mind. Electronic computing apparatuses such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot selectively respond to a device assignment when a server is operating in an off-line mode, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM, a PROM, an EPROM, an EEPROM, a Flash memory and other examples previously herein mentioned.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A controller apparatus that communicates with a plurality of mobile video recording devices when a system is in operation, the system including the controller apparatus and the mobile video recording devices, and the controller apparatus comprising:
   an interface communicatively couplable over at least one network to a server, and wherein the server, when operating in a normal mode associated with communications between the controller apparatus and the server being on-line, records each of the mobile video recording devices as being assigned to a respective user;
   at least one processor; and
   at least one non-transient computer readable medium communicatively connected to the at least one processor and configured to store:
      a plurality of device assignment records in relation to the mobile video recording devices, during a time when the server operates in an off-line mode when communication between the controller apparatus and the server is off-line, and the device assignment records defining respective users as assigned to the mobile video recording devices,
      video received from at least one of the mobile video recording devices during the off-line mode, and
      computer program instructions which, when executed by the at least one processor, cause the controller apparatus to:
         in response to one or more device assignment requests received when the server is operating in the off-line mode, create the one or more device assignment records that define the respective one or more users as assigned to the at least one mobile electronics device, and
         in response to the server re-entering the normal mode, update the server by causing at least the one or more device assignment records to be stored in the server.

2. The controller apparatus as claimed in claim 1 further comprising a single device housing, and
   wherein the interface, the at least one processor and the at least one non-transient computer readable medium are all contained within the single device housing.

3. The controller apparatus as claimed in claim 2 further comprising a credentials input device that is configured to receive user credentials as input and initiate a credentials validation request within the controller apparatus, and wherein at least a portion of the one or more assignment records are derived from the user credentials.

4. The controller apparatus as claimed in claim 3 wherein the credentials input device includes at least one of a Radio Frequency Identification (RFID) card reader, a Bluetooth-based reader, a keypad, a keyboard and a biometric reader.

5. The controller apparatus as claimed in claim 1 wherein the server operates in the off-line mode when a connectivity issue exists in the at least one network, an upgrade to the server is taking place, or maintenance tasks in relation to the server are taking place.

6. The controller apparatus as claimed in claim 1 wherein the at least one non-transient computer readable medium is further configured to store audit events that transpire during a period of time when the server is operating in the off-line mode.

7. The controller apparatus as claimed in claim 1 wherein the at least one network includes a part of the Internet and at least a part of the server resides within a cloud environment.

8. The controller apparatus as claimed in claim 1 wherein the plurality of mobile video recording devices is a plurality of body-worn cameras.

9. A controller apparatus that communicates with a plurality of mobile video recording devices when a system is in operation, the system including the controller apparatus and the mobile video recording devices, and the controller apparatus comprising:
   an interface communicatively couplable over at least one network to a server, and wherein the server, when operating in a normal mode associated with communications between the controller apparatus and the server being on-line, records each of the mobile video recording devices as being assigned to a respective user;
   at least one processor; and
   at least one non-transient computer readable medium communicatively connected to the at least one processor and configured to store:
      a plurality of device assignment records in relation to the mobile video recording devices, during a time when the server operates in an off-line mode when communication between the controller apparatus and the server is off-line, and the device assignment records defining respective users as assigned to the mobile video recording devices, and computer program instructions which, when executed by the at least one processor, cause the controller apparatus to:
  in response to one or more device assignment requests received when the server is operating in the off-line mode, create the one or more device assignment records that define the respective one or more users as assigned to the at least one mobile electronics device, and
  in response to the server re-entering the normal mode, update the server by causing at least the one or more device assignment records to be stored in the server,
  wherein no space is allocated within the at least one non-transient computer readable medium to store any video transmitted from any of the mobile video recording devices during the off-line mode.

10. The controller apparatus as claimed in claim 9 further comprising a single device housing, and
  wherein the interface, the at least one processor and the at least one non-transient computer readable medium are all contained within the single device housing.

11. The controller apparatus as claimed in claim 10 further comprising a credentials input device that is configured to receive user credentials as input and initiate a credentials validation request within the controller apparatus, and wherein at least a portion of the one or more assignment records are derived from the user credentials.

12. The controller apparatus as claimed in claim 11 wherein the credentials input device includes at least one of a Radio Frequency Identification (RFID) card reader, a Bluetooth-based reader, a keypad, a keyboard and a biometric reader.

13. The controller apparatus as claimed in claim 9 wherein the server operates in the off-line mode when a connectivity issue exists in the at least one network, an upgrade to the server is taking place, or maintenance tasks in relation to the server are taking place.

14. The controller apparatus as claimed in claim 9 wherein the at least one non-transient computer readable medium is further configured to store audit events that transpire during a period of time when the server is operating in the off-line mode.

15. The controller apparatus as claimed in claim 9 wherein the at least one network includes a part of the Internet and at least a part of the server resides within a cloud environment.

16. The controller apparatus as claimed in claim 9 wherein the plurality of mobile video recording devices is a plurality of body-worn cameras.

* * * * *